Patented June 26, 1951

2,558,363

UNITED STATES PATENT OFFICE 2,558,363

PHOTOCATALYTIC MANUFACTURE OF BENZENE HEXACHLORIDE

Alfred Jerome Kolka, Birmingham, and Harold David Orloff, Detroit, Mich., assignors to Ethyl Corporation, New York, N. Y., a corporation of Delaware No Drawing. Application May 20, 1950, 6 Claims. (Cl. 204—163)

This invention relates to the manufacture of benzene hexachloride by reacting benzene and chlorine in the presence of actinic light and selected additives which are used to increase the gamma isomer content of the product.

Benzene hexachloride is a well-known commercial insecticide. It is also well known that the gamma isomer is the most important, not only because it is of higher potency, but also because its toxicity is not passed on to humans and stock to any appreciable extent. The other isomers have little, if any, effectiveness as an insecticide and some of them are harmful to humans and stock.

Ordinarily, by reacting benzene and chlorine in the presence of actinic light, benzene hexachloride containing about 12 to 13 per cent by weight of the gamma isomer, is obtained. This product is either sold as a low-grade product, or the gamma content is concentrated by solvent extraction and crystallization. The gamma isomer is either sold for a premium or used to raise the gamma content of low-grade benzene hexachloride in order to increase the latter's market value or in some cases to make the low-grade benzene hexachloride marketable. Thus it is obvious that any process which will increase the gamma content is important.

It is therefore an object of our process to conduct the present processes for making benzene hexachloride in the presence of additives which will increase the gamma content as much as 20 to 50 per cent.

The above object is accomplished by the photocatalyzed addition chlorination of benzene in the presence of organic carboxylic acids, carboxylic acid anhydrides, chlorocarboxylic acids and carboxylic acid chlorides.

Besides the above obvious advantage of our process, the attainment of a higher gamma content not only usually increases the total production of the gamma isomer for any given apparatus but also makes it possible to market a product without further treatment, which product otherwise would not be marketable. Furthermore where concentration of the gamma is effected, savings are made due to the handling of less material.

Our process is particularly advantageous as a continuous process, using a transparent coil surrounded by actinic light. In such a process the benzene to chlorine ratio must be relatively high in order to maintain the benzene hexachloride in solution. Complete conversion of the chlorine is desired not only to obtain the maximum capacity but to simplify the separation and recovery steps. However, in some instances when the light intensity is adjusted to convert all of the chlorine, the gamma content of the benzene hexachloride product has been known to decrease to as low as 4 per cent. Such a low gamma product is unmarketable or requires expensive processing to concentrate it. Thus in present continuous processes the chlorine is not completely converted when it is desired to obtain the highest possible gamma yield. However, by use of one of our additives for increasing the gamma content, maximum capacities are obtained with complete conversion of the chlorine.

Our process is preferably conducted at temperatures between 10 and 80° C. Substantially atmospheric pressure is all that is required although higher pressures can be used. Actinic light ordinarily employed for this purpose is used, say between 3000 and 6000 angstrom units. The benzene to chlorine ratio is preferably between 3:1 and 15:1.

Examples of the acids which can be used in our invention are acetic, propionic, butyric, succinic, oxalic, maleic and benzoic. The anhydrides of the above acids can also be used as well as the corresponding acid chlorides. An example of some of the chlorine compounds are trichloroacetic acid, acetyl chloride, trichloropropionic acid, benzoyl chloride and butyryl chloride. The amount of the additive employed is relatively unimportant. When the additive is a liquid it can be used as the main solvent for the process in lieu of the customary benzene, in which case only sufficient amounts of benzene and chlorine are used to obtain the desired concentration of benzene hexachloride in the resulting solution. Where the additive is not directly soluble, benzene is used as a solvent in the customary manner and only a relatively small amount of the additive is used. In general, keeping the above in mind, the quantity of additive varies from 5 parts per 100 parts of benzene to 5 parts benzene per 100 parts of additive. Furthermore, where the additive is volatile it can be recovered and reused by physical means such as flash vaporization. Both volatile and non-volatile additives can be recovered by chemical means. However, where the quantity of additive is small, recovery may be unimportant and the relatively small amounts used can be disposed of by water-washing and neutralization. Our invention can be best understood by referring to the following working examples.

To a reactor having suitable cooling means were added 391 parts by weight of acetic anhydride and 35 parts of benzene. Ninety (90) parts of chlorine were then introduced into the reaction mixture and the temperature was held at about 25° C. for about two and one-half hours. The entire reaction mixture was subjected to an actinic light source comprising clear glass infrared lamps. The acetic anhydride was removed by washing and neutralizing, and the benzene hexachloride separated. The yield of benzene hexachloride was 125.5 parts or 95 per cent by weight based on the chlorine charged. The gamma isomer content of the benzene hexachloride product was 17.5 per cent by weight or 16.8 per cent of the chlorine charged.

In another operation similar to the above example except that no additive was employed, in which 73 parts by weight of chlorine was added to 350 parts by weight of benzene, a yield of 95.1 per cent of the benzene hexachloride based on the chlorine was obtained, the gamma isomer thereof amounting to 11.8 per cent or 11.2 per cent based on the chlorine charged. Thus the additive caused an improvement of 48 per cent in the gamma isomer contained in the benzene hexachloride product or an improvement in the yield of the gamma isomer based on the chlorine charged, of over 50 per cent.

In similar operations using substantially the same proportions of materials as well as the same conditions, yield improvements in the gamma isomer based on the chlorine charged, of between 35 and 50 per cent were obtained when the following additives were substituted in lieu thereof: glacial acetic acid, propionic acid, acetyl chloride, propionic anhydride and propionyl chloride.

Mixtures of additives can also be used. Thus when 336 parts of glacial acetic acid and 43 parts of acetic anhydride were used with 35 parts of benzene and 90 parts of chlorine, the conditions being the same as in the above example for acetic anhydride, the benzene hexachloride produced contained 17.1 per cent by weight of the gamma isomer, which is almost a 50 per cent improvement over the operation employing no additive.

In the above examples the additive also served as a solvent. Examples of operations where the additive is used in a minor proportion are as follows: In an operation similar to that given previously for acetic anhydride, 262 parts of benzene were reacted with 91 parts of chlorine in the presence of 100 parts of trichloroacetic acid. The yield of benzene hexachloride, based on the chlorine was 95.0 per cent by weight, the gamma isomer content thereof being 17.2 per cent, and the yield of the gamma isomer based on the chlorine, 16.3 per cent by weight. Thus, again about a 50 per cent improvement was obtained over similar tests in which no additive was employed. Also, when 350 parts of benzene were reacted with 75.7 parts of chlorine in the presence of 40 parts of picric acid the gamma isomer content of the benzene hexachloride was 15.4 per cent, or over a 30 per cent improvement.

In all of the above examples the gamma isomer was determined by infrared analysis. The non-gamma isomers in the main were alpha, beta, delta and epsilon.

We claim:

1. In the process of manufacturing benzene hexachloride by the photocatalyzed chlorination of benzene, the improvement comprising conducting said photocatalyzed chlorination of benzene in admixture with an organic additive selected from the group consisting of organic carboxylic acids, carboxylic acid anhydrides, chlorocarboxylic acids and carboxylic acid chlorides.

2. The process of claim 1 in which the organic additive is an organic carboxylic acid anhydride.

3. The process of claim 1 in which the organic additive is acetic acid.

4. The process of claim 1 in which the organic additive is acetyl chloride.

5. The process of claim 1 in which the organic additive is a chloroacetic acid.

6. The process of claim 1 in which the organic additive is acetic anhydride.

ALFRED JEROME KOLKA.
HAROLD DAVID ORLOFF.

REFERENCES CITED

The following references are of record in the file of this patent:

UNITED STATES PATENTS

| Number | Name | Date |
| --- | --- | --- |
| 2,218,148 | Hardie | Oct. 15, 1940 |
| 2,438,900 | Cooke et al. | Apr. 6, 1948 |
| 2,452,154 | Ross | Oct. 26, 1948 |
| 2,513,092 | Gonze | June 27, 1950 |

FOREIGN PATENTS

| Number | Country | Date |
| --- | --- | --- |
| 469,299 | Belgium | Dec. 1, 1946 |